US010007912B2

(12) United States Patent
Gaur et al.

(10) Patent No.: US 10,007,912 B2
(45) Date of Patent: *Jun. 26, 2018

(54) CLIENT-SIDE SECURITY FOR TOKENIZED TRANSACTIONS

(71) Applicant: International Business Machines Corporation, Armonk, NY (US)

(72) Inventors: Nitin Gaur, Round Rock, TX (US); Gregory Louis Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/962,116

(22) Filed: Dec. 8, 2015

(65) Prior Publication Data

US 2016/0217458 A1    Jul. 28, 2016

Related U.S. Application Data

(63) Continuation of application No. 14/605,446, filed on Jan. 26, 2015, now Pat. No. 9,799,032.

(51) Int. Cl.
*G06Q 40/00* (2012.01)
*G06Q 20/40* (2012.01)
(Continued)

(52) U.S. Cl.
CPC ....... *G06Q 20/401* (2013.01); *G06Q 20/3278* (2013.01); *G06Q 20/367* (2013.01); *G06Q 20/3672* (2013.01); *G06Q 20/382* (2013.01)

(58) Field of Classification Search
CPC ......... G06Q 20/10; G06Q 20/40; G06Q 20/32
(Continued)

(56) References Cited

U.S. PATENT DOCUMENTS 7,481,359 B2 *  1/2009  Kawase ................ G06Q 20/10
                                                    235/379
8,290,876 B1   10/2012  Powell
(Continued)

FOREIGN PATENT DOCUMENTS

CN          103679443        3/2014
CN          104021469        9/2014

OTHER PUBLICATIONS

"PCT Application No. PCT/IB2016/050189 International Search Report and WO", dated May 17, 2016, 11 pages.
(Continued)

*Primary Examiner* — Jamara Franklin
(74) *Attorney, Agent, or Firm* — DeLizio Law, PLLC

(57) ABSTRACT

A method for processing transactions within a token transfer device, such as a smartphone or other portable electronic device. The method includes storing a transaction token having a specified transaction resource value and an associated validation parameter in the memory of the token transfer device. A transaction communication interface initiates a transaction service with a token recipient terminal and invokes a token state manager. The token state manager determines an event corresponding to the specified validation parameter by determining a transaction resource network connect activity status and by determining condition register data associated with the validation parameter. The token state manager then issues a transaction modification call based on the determined event and the validation parameter.

9 Claims, 9 Drawing Sheets

(51) Int. Cl.
*G06Q 20/38* (2012.01)
*G06Q 20/36* (2012.01)
*G06Q 20/32* (2012.01)

(58) Field of Classification Search
USPC ............................... 235/375, 379, 380, 382
See application file for complete search history.

(56) References Cited

U.S. PATENT DOCUMENTS

| | | |
|---|---|---|
| 8,682,802 B1 | 3/2014 | Kannanari |
| 8,818,867 B2 | 8/2014 | Baldwin et al. |
| 2013/0173474 A1 | 7/2013 | Ranganathan et al. |
| 2014/0006775 A1 | 1/2014 | Dixon et al. |
| 2014/0108260 A1 | 4/2014 | Poole et al. |

OTHER PUBLICATIONS

Anonymous, "Method and Process for Predefining and Leveraging Display Sensitive Window Arrangements, IP.com", IPCOM000211123D, Sep. 21, 2011, Sep. 21, 2011, 4 pages.
Anonymous, "Whiteboard Type User Interface, IP.com", IPCOM000237953D, Jul. 23, 2014, Jul. 23, 2014, 4 pages.
U.S. Appl. No. 14/962,116, filed Dec. 8, 2015.
U.S. Appl. No. 14/605,446, filed Jan. 26, 2015.

* cited by examiner

500

| PARAMETER | C_REG | REG_VAL | RCI_T1 | RDI_T1 | RCI_T2 | RDI_T2 |
|---|---|---|---|---|---|---|
| MAX_INCREMENT | ---- | ---- | 500 | 25 | ---- | 20 |
| GEO | CR_2 | LOCAL | ---- | REMOTE | ---- | REMOTE |
| AUTHEN_NFC_ID | CR_3 | LEVEL 2 | LEVEL 3 | LEVEL 2 | LEVEL 2 | LEVEL 1 |
| BC | CR_4 | BC | ---- | BC | ---- | BC |
| ⋮ | ⋮ | ⋮ | ⋮ | ⋮ | ⋮ | ⋮ |

FIG. 5

CLIENT-SIDE SECURITY FOR TOKENIZED TRANSACTIONS

RELATED APPLICATIONS

This application is a Continuation of and claims the priority benefit of U.S. application Ser. No. 14/605,446 filed Jan. 26, 2015.

BACKGROUND

Embodiments of the disclosed subject matter generally relate to the field of processing intermediate representations in multi-device computer transactions. More particularly, the inventive subject matter relates to providing client-side security for multi-device tokenized transactions.

Magnetic stripe cards have long been the main form of performing mobile electronic transactions in which a reader in a point-of-sale (POS) or other transaction terminal receives account information encoded in the stripe. These magnetically encoded cards are used in for retail purchases, coupon redemption, etc. The account data retrieved from a card is sent by the transaction terminal to a resource account server that responds with authorization to apply resources from a specified resource account such as a bank checking or savings account.

Substantial developments in the capacity and flexibility of operation of mobile electronics devices (e.g., smartphones) has resulted in developments in mobile electronic payments by portable electronic devices such as smartphones. Radio frequency (RF) interfaces, such as near-field-communication (NFC), are typically utilized for mobile electronic transactions rather than the traditional magnetic stripe readers. Mobile payment solutions include electronic or mobile money and electronic or mobile wallets. While mobile payment systems continue to develop using recently developed technology, security remains a significant issue for electronic transaction systems.

SUMMARY

A method is disclosed for processing transactions within a token transfer device, such as a smartphone or other portable electronic device. The method includes storing a transaction token having a specified transaction resource value and an associated validation parameter in the memory of the token transfer device. A transaction communication interface initiates a transaction service with a token recipient terminal and invokes a token state manager. The token state manager determines an event corresponding to the specified validation parameter by determining a transaction resource network connect activity status and by determining condition register data associated with the validation parameter. The token state manager then issues a transaction modification call based on the determined event and the validation parameter.

BRIEF DESCRIPTION OF THE DRAWINGS

The present embodiments may be better understood, and numerous objects, features, and advantages made apparent to those skilled in the art by referencing the accompanying drawings.

FIG. 5 is a conceptual diagram of a token state manager transaction event table in accordance with an embodiment;

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
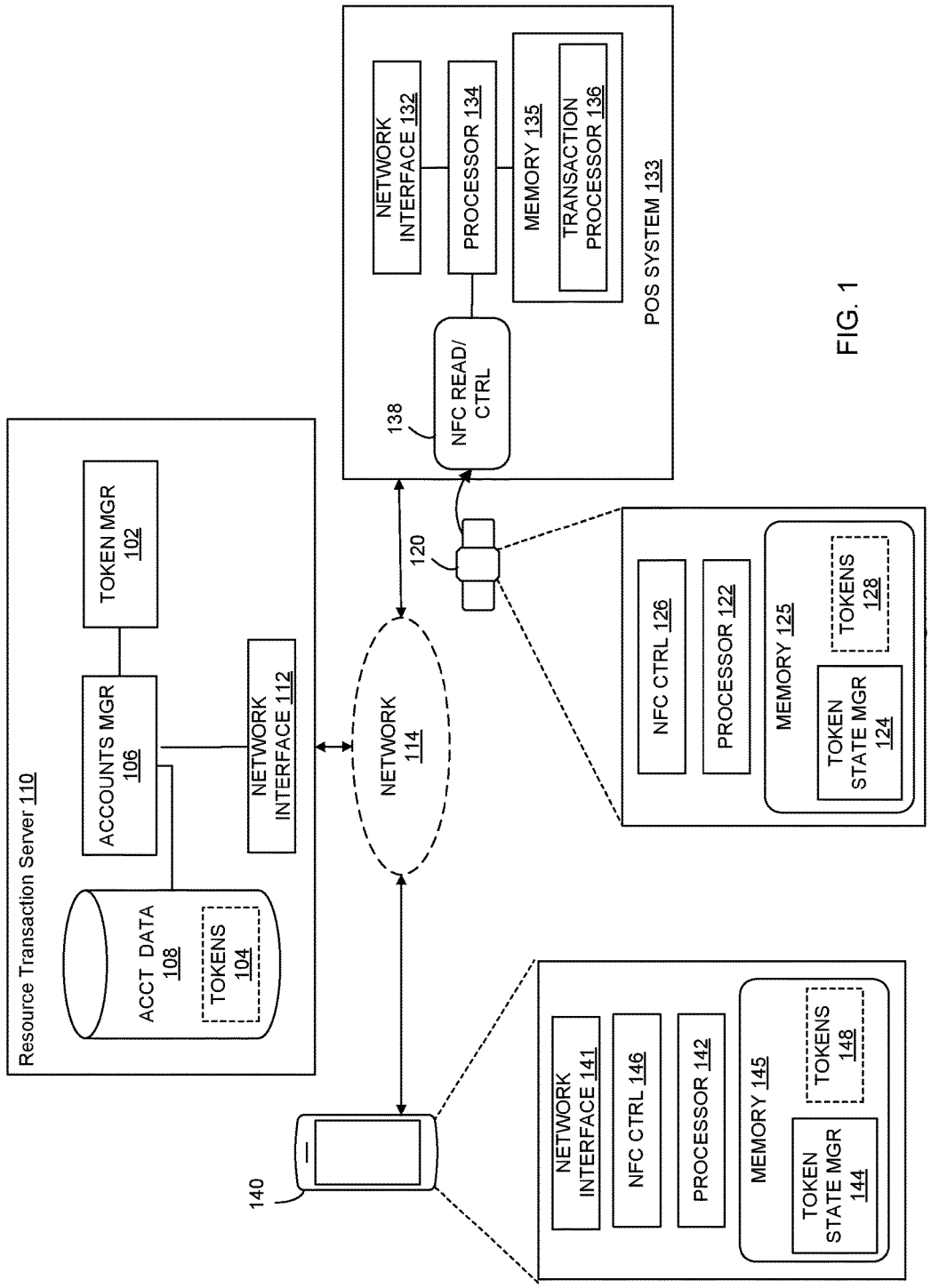
FIG. 1 is a high-level system diagram depicting components that are included in or may interact with a client-side token security system in accordance with an embodiment.

Embodiments described herein enable secure online or offline mobile device payments using a network accessible transaction resource. FIG. 1 is a high-level system diagram depicting systems that are included in or may interact with a client-side token security system in accordance with an embodiment. The systems include a network 114 providing connectivity over which a resource transaction server 110 communicates with a wireless device 140 and a point-of-sale (POS) system 133. The connectivity may be established by multiple subnetworks and different types of network components, connection media and protocols, and carrier services such as fiber optic cables, telephone lines, Ethernet 802, and Internet protocols. In one aspect, network 114 enables communications between wireless device 140 and resource server 110 in support of processing of a specified resource account among multiple resource accounts (not depicted) that are stored as account data within an accounts database 108 and managed by an account manager 106 within resource server 110. In another aspect, network 114 enables communications between resource server 110 and POS system 133 in support of resource transactions, such as a credit amount transfer during a credit card payment transaction, in which resource server 110 authenticates or otherwise validates encoded account information provided to POS system 133 such as by wireless device 140.

Resource server 110 and accounts manager 106 are typically associated with a financial institution such as a bank or credit issuing institution that establishes and organizes monetary accounts associated with and accessible by account clients. In the depicted embodiment, resource server 110 includes a network interface 112 for communicating across network 114 in support of resource account transaction communications with accounts manager 106. Accounts database 108 stores account data, typically on behalf of individual users or institutions, that may include debit and credit accounts, transaction types (e.g., online or offline), and transaction instruments (e.g., credit card, debit card, etc.). Accounts manager 106 performs related roles of tracking account information and verifying the account information during POS transactions such as conducted between wireless device 140 and POS system 133. During a payment transaction, for example, resource server 110 may send a transaction authorization to POS system 133 in response to processing specific transaction information (e.g., purchase amount and account identification) sent by POS system 133.

Resource server 110 further includes a transaction token manager 102 that may be integrated with or otherwise communicatively coupled to accounts manager 106. Token manager 102 generates and maintains account-specific transaction tokens 104 in association with accounts stored within accounts database 108. As utilized "token" and "token identification" may be used synonymously to designate a data structure utilized for representing a transaction resource. In the case of a tokenized financial transaction, tokens are used to replace sensitive payment data with a relatively unique identifier that is difficult or impossible to mathematically reverse. The resource data (e.g., customer and account identity and payment data) is centrally stored and managed by accounts manager 106, which as explained above, is typically operated by the underlying resource provider or broker.

POS system 133 is depicted in FIG. 1 as including a network interface 132 for communicating over network 114 as well as a processor 134 and associated system memory 136. A transaction processor application 136 is stored in memory 135 and executed by processor 134 in support of payment transactions such as between wireless device 140 and POS system 133. Transaction processor application 136 includes executable code and logical processing constructs for processing payment account information received at a payment interface such as an NFC reader/controller 138, and generating a corresponding payment account authorization request that POS system 133 sends to resource transaction server 110. More specifically, POS system 133 executes transaction processor application 136 to read account data from a payment device, to confirm via communications with resource server 110 that authorized account resources are available, to cooperate with resource server 110 in transferring the account resources (e.g., monetary credit) from the specified account to another account, and to record the transaction.

Wireless device 140 includes a network interface 141, a processor 142 and an associated system memory 145 that stores data and system and application software. Network interface 141 comprises hardware and software components to implement transceiver connectivity and protocol processing to enable wireless device 140 to communicate with network-connected devices such as resource transaction server 110 and POS system 133. Network interface 141 includes a wireless network interface controller (not depicted) and other devices and logic components for connecting, disconnecting and sending and receiving messages across RF-based networks. Processor 142 and memory 145 may provide additional processing capability necessary for network communications and furthermore enable wireless device 140 to perform other information handling tasks related to, incidental to, or unrelated to the methods described herein. In various embodiments, wireless device 140 may be contained in different external dimensions, packaging and form factors. Mobile device 140 may be a cell phone or other type of mobile phone or highly integrated portable device such as a smartphone or any other type of portable electronic device having network connectivity.

Wireless device 140 further includes a Near Field Communication (NFC) controller 146 for communicating with POS system 133 through NFC reader module 138. NFC is a form of "contactless" RF communication technology that enables one-way or two-way communication between terminals (devices or endpoints) that are in relative close proximity (typically a within a few centimeters). A transaction service connection may be established by positioning, waving, or otherwise moving wireless device 140 near or onto NFC reader 138. In some embodiments, a connection may also be established by directly contacting wireless device 140 to the surface a reader such as NFC reader 138.

FIG. 1 further depicts a wearable electronic device ("wearable device") 120 that, like wireless device 140, includes a processor 122, an associated system memory 125, and an NFC controller 126. A wearable device, such as wearable device 120, is classified in one respect as a type of electronic device having a form factor suitable for being attached in some manner to a user. For example, wearable device 120 may be form factored to be fastened to, adhered to, hung onto, or otherwise fixedly attached to an article of clothing or a part of a user's body such as a wrist, nose, ear, etc. Other significant features common to wearable computing devices include relatively continuous active operation and a form factor enabling continuous and uninterrupted access to and usage of the device by the user. Examples of wearable device form factors include those similar to eyeglasses (e.g., Google Glass) or a wristbands. Wearable device 120 may be used for general or special purpose processing and communication activities that require more complex computational support than pre-coded hardware logic alone.

The depicted systems and components generally enable account resource transactions whereby, for example, a user may make payments using accounts maintained by and associated with the user by the components within resource server 110. NFC-enabled devices such as wearable device 120 and wireless device 140 are examples of devices that are increasingly being used for mobile resource transactions such as mobile POS (mPOS) transactions. Fundamentally, an NFC service transaction between a mobile device, such as either of devices 120 and 140, and a POS terminal such as POS system 133, entail the NFC controller and associated transaction applications emulating a physical transaction payment instrument such as a credit card. For example, wireless device 140, which is typically hand-carried by a user, may interact with POS system 133, which is typically included in onsite retail transaction equipment of a vendor, to process a payment transaction as follows.

Wireless device 140 operates as an initiator device and therefore begins a service transaction by requesting a peer-to-peer service transaction with POS system 133, which operates as the target device. The respective NFC controllers 146 and 138 operate in request/reply mode following the initial request for service to process and complete the transaction. NFC controller 146 directly or indirectly (e.g., via security logic) communicates with a resource transaction application (not depicted) associated with a resource account maintained by resource server 110. The resource transaction application is stored in and executed by wireless device 140 to access monetary or other transaction exchange values. During the transaction, wireless device 140 may communicate with payment resource server 110 to access applicable account information which can then be used in the transaction. Similarly, wearable device 120 can be used as a physical payment proxy in transacting with POS system 133 via NFC reader/controller 138. However, since wearable device 120 is not network-enabled (i.e., includes no network interface), it must rely on receiving account information from a suitably paired network-enabled device such as wireless device 140 or must use account information stored locally within memory 125. In the case of device pairing, wearable device 120 may be communicatively coupled (such as via a Bluetooth connection) with wireless device 140 which operates as an intermediary, transferring account information from resource server 110 to wearable device 120. POS system 133 receives and processes the account information from wearable device 120 in order to complete the transaction. In the case of internal account information storage, wearable device 120 may either present locally pre-stored, static account information.

Distributed transmission, storage, and usage of actual account data present a variety of resource account data security issues. For both wireless device 140 and wearable device 120, the depicted embodiment provides a tokenized transaction service that addresses data security issues that may otherwise arise. Namely, wireless device 140 and wearable device 120 may retrieve, store, process, and send transaction tokens such as tokens 148 and 128 during service transactions with POS system 133 such that little, if any, account information is required to be transferred between devices 140 or 120 and system 133.

Figure 2:
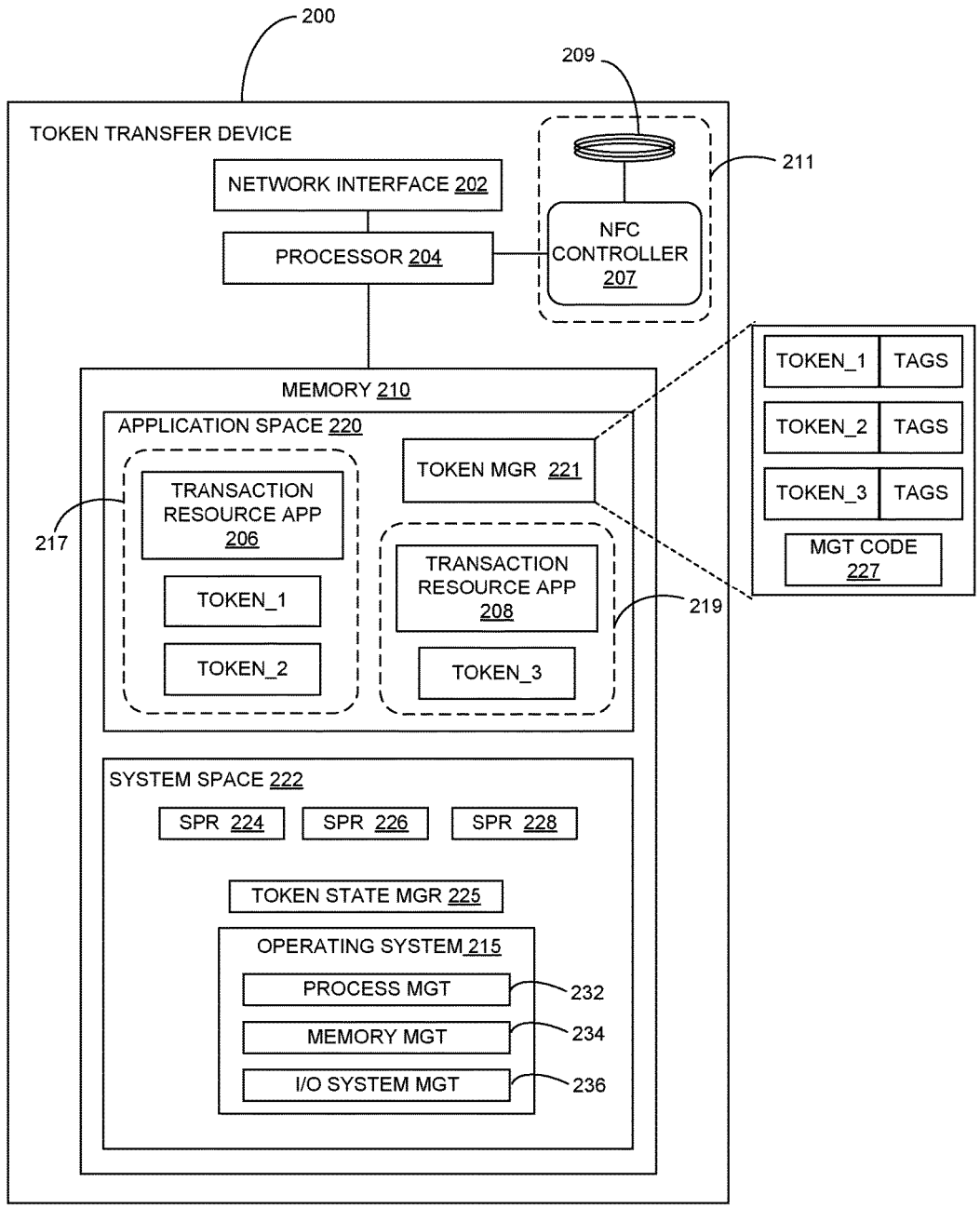
FIG. 2 is a block diagram illustrating a token transfer device in accordance with an embodiment.

FIG. 2 is a block diagram illustrating a token transfer device 200 in accordance with an embodiment. The depicted embodiment shows token transfer device 200 as including a network interface 202 such as may be included with a wireless, network-enabled device such as a mobile phone. It should be noted, however, that the token transaction functionality depicted and described with reference to FIG. 2 may also be packaged in and implemented from a non-network enabled device such as wearable device 120 depicted in FIG. 1. It should be further noted that components and functions that are typically included with mobile electronic device such as user input/output mechanisms and displays may be incorporated in device 200 but are not illustrated to avoid obfuscation. Token transfer device 200 further includes a host processor 204 and associated host memory 210 which cooperatively function to manage various system-level and application-level programs and data that enable device 200 to perform various transaction service tasks associated with resource transaction accounts such as those described with reference to FIG. 1. Device 200 further includes a transaction communication interface in the form of an NFC interface 211 in the depicted embodiment. NFC interface 211 comprises an NFC controller 207 for communicating with a POS system or other active NFC transaction terminal. NFC interface 211 also includes an NFC antenna 209 for generating and maintaining wireless connectivity with other NFC devices such as an NFC-enabled POS system.

Consistent with known memory management and organization techniques, memory 210 is allocated between a system memory addressable space 222 and an application-level addressable space 217. System memory space 222 stores programs and supporting data that control operations of device 200 and its components. The system software stored within system memory space 222 includes operating system (OS) software that coordinate all the activities among computer hardware devices, and utility program software that performs a specific task, usually related to managing a computer, its devices, or its programs.

In the depicted embodiment, an operating system (OS) 215 and a token state manager utility 225 are maintained within system memory space 222. OS 215 may be a flexible, multi-purpose OS such as the Android OS found in smartphones or may be an embedded OS having more specialized functions such as may loaded within a wearable electronic transaction device. OS 215 generally comprises code for managing and providing services to hardware and software components within device 200 to enable program execution. Among other code and instructions, OS 215 includes process management code 232 comprising instructions for interfacing application code with system hardware and software. OS 215 further includes memory management code 234 for allocating and managing memory for use by application and system-level programs. OS 215 further includes I/O system management code 236 including device drivers that enable the system's hardware to communication with external computer systems.

In the depicted embodiment, a pair of transaction resource applications 206 and 208 are stored in respective application memory spaces 217 and 219. Transaction resource applications 206 and 208 each contain program instructions and data associated with a respective transaction resource account. For example, transaction resource application 206 may be a user application including program instructions and data associated with a general purpose (i.e., "open-loop") credit account, while transaction resource application 208 may be a user application comprising program instructions and data associated with a specified single-vendor (i.e., "closed loop") credit account. Transaction resource applications 206 and 208 operate to enable processing and retrieval of transaction account information including transaction exchange values (e.g., monetary credit values) available from one or more user accounts. In addition, transaction resource applications 206 and 208 operate to request/retrieve and process transaction tokens that may be utilized for service transactions such as with a POS system. In the depicted embodiment, each of transaction resource applications 206 and 208 includes instructions and data enabling each to request and/or generate transaction tokens using the processing and network communications components within device 200.

A pair of transaction tokens, TOKEN_1 and TOKEN_2, are stored in association with transaction resource application 206, and a token, TOKEN_3, is stored in association with transaction resource application 208. Transaction tokens TOKEN_1, TOKEN_2, and TOKEN_3 may have been requested from one or more resource account managers, such as account manager 106 shown in FIG. 1, or may have been locally generated. The tokens are used in processing vending transactions as, in effect, a replacement for account information that would otherwise be required by a POS system to validate an account and confirm that adequate account resources are available for a given transaction. Each token includes a token ID and a transaction exchange value. The token ID may be a pseudo-randomly generated number or alphanumeric code that is assigned and recorded when the token is initially generated. The transaction exchange value is typically a numerical monetary value specified in designated exchange units. As explained in further detail with reference to FIGS. 4 and 5, tokens further include or are otherwise logically associated with condition or validation parameters that are encoded by any of a resource account manager, a token transfer device such as device 200, or other intermediary device that may obtain the tokens to limit the conditions under which the tokens may be utilized in resource transactions.

The depicted embodiment further includes a token manager application 221 stored within and executed from application memory space 220. Token manager 221 may perform some or all of the token-related functions that would otherwise be assigned to transaction resource applications 206 and 208. As shown, token manager 221 comprises management code 227 that includes instructions and data for enabling validation parameters to be associated with tokens, including assigning, modifying, and/or removing validation parameters, depicted as TAGS_1, TAGS_2, and TAGS_3 associated with TOKEN_1, TOKEN_2, and TOKEN_3, respectively. Token manager 221 may further encompass or include logical associations with the token data structures, TOKEN_1, TOKEN_2, and TOKEN_3.

In addition to the token retrieval and management provided at an application-level by token manager 221 and/or transaction resource applications 206 and 208, device 200 includes system-level token management code that enables universal conditioning and processing of token transactions for tokens having application-specific attributes. Specifically, system memory space 222 includes a token state manager 225 that operates in conjunction with OS 215, token manager 221, and transaction resource applications 206 and 208 to condition/limit token transactions in accordance with processing and network environment factors as well as transaction-specific conditions. Token state manager 225 has programmed access to a set of one or more special purpose registers (SPRs) 224, 226, and 228 which store specified conditions and parameters relating to whether and/or to what extent a particular token transaction may be processed. As explained in further detail with reference to FIGS. 4-8, token state manager 225 may process the condition/parameter data in SPRs 224, 226, and 228 in programmed combinations that may be designated as "events." In one embodiment, SPR 224 may store a resource connectivity flag that indicates whether or not a network interface program, such as web browser, and/or a client side transaction resource application program within device 200 is actively communicatively connected to a specified remote resource account interface program. SPR 224 may also store a flag indicating current connectivity with a specified resource account network interface, such as a web document or page corresponding to a particular user account. SPRs 226 and 228 may store data or single-bit flags indicating conditions that token state manager 225 applies to determine whether or not to issue a transaction modification call.

As explained in further detail with reference to FIGS. 3-8, token state manager 225 is invoked during a transaction service request and operates to determine whether or not to issue a transaction modification call depending on the connectivity status of device 200 and other conditions specified by the SPRs. In one embodiment, token state manager 225 may be invoked originally by a transaction communication interface, such as NFC interface 211, and via OS 215 during a transaction service request. In another embodiment, token state manager 225 may be invoked directly and originally by OS 215 in response to OS 215 detecting processing of a service transaction request by NFC interface 211.

Figure 3:
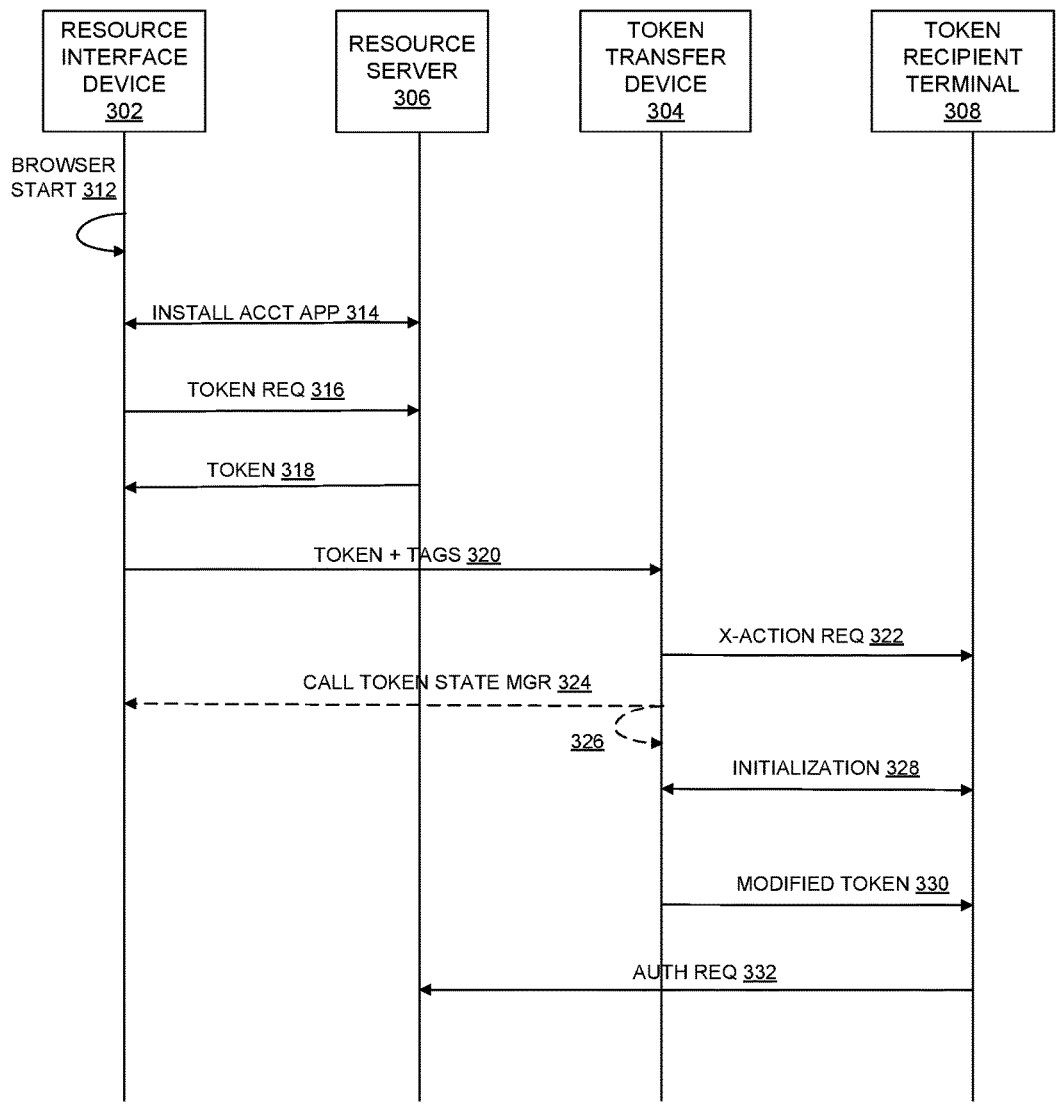
FIG. 3 is a signaling diagram depicting a token transfer message protocol in accordance with an embodiment.

FIG. 3 is a signaling diagram depicting a token transfer protocol in accordance with one embodiment. The entities operably involved in the example token transfer process include a resource account server 306, a resource interface device 302, a token transfer device 304, and a token recipient terminal 308. Resource account server 306 includes hardware and software for managing resource accounts and for processing $3^{rd}$ party transactions. Resource interface device 302 is a network-enabled portable electronic device, such as a smartphone, that includes a locally stored resource account program that may be executed in conjunction with a network access program, such as a web browser, to communicatively access resource account server 306 across a network. Token transfer device 304 is a portable electronic device that may or may not be network-enabled, and which includes at least one direct, near-field communication interface by which is can communicate with a token recipient terminal 308 and resource interface device 302.

The protocol begins as shown with resource interface device 302 executing a network access program 312 such as a web browser access followed by a network transaction 314 in which resource interface 302 installs a resource account application program received from resource server 306. The locally installed account resource program enables resource interface device 302 to access, modify, and send specified resource account information and requests to and from resource server 306. As further depicted, resource interface device 302 sends a token request message 316 to resource server 306. Token request 316 may be generated by the locally installed resource account application program and communicated over a network interface. Resource server 306 responds with a token send message 318 that includes at least one token and associated account information. Resource interface device 302 stores the token(s) in local storage in association with a corresponding resource account application and/or in association with a separate token management application. For example, if resource server 306 issues a token to be used as a transaction item for a specified credit card account, resource interface device 302 may store the token in local storage and in memory allocated for a resource account application corresponding to the credit card account.

In accordance with an aspect of the depicted embodiment, resource interface device 302 further includes a token manager application, such as token manager 221 in FIG. 2, which may be used to generate transaction condition tags that specify one or more validation parameters and associate the tags with one or more of the token(s). Resource interface device 302 may use the token-associated tags during tokenized resource transactions such as with token recipient terminal 308 as depicted and described in further detail with reference to FIGS. 5-8. Alternately, and as shown in FIG. 3, the tokens and associated tags are sent (e.g., upload/download) to token transfer device 304, which may be a wearable electronic device such as device 120 in FIG. 1. Token transfer device 304 includes a near-field communication interface that can be used in conjunction with a locally stored resource account application to initiate an account service transaction such as via a transaction request 322 sent from token transfer device 304 to token recipient terminal 308.

During a setup transaction phase commenced upon the transaction request 322, token transfer device 304 calls or otherwise invokes a token state manager such as token state manager 225 in FIG. 2. As depicted in FIG. 3, the call may be an internal OS call 326 or may be a near-field (e.g., via Bluetooth) message 324 prompting resource interface device 302 to internally call a locally stored token state manager. Once called, and during an initialization protocol 326 which may include a client requested suspension, the token state manager processes the token-associated tags in combination with system and transaction condition information that may be stored in system registers within either or both of token transfer device 304 and resource interface device 302. The token state manager, either locally from token transfer device 304 or remotely from resource interface device 302, determines a transaction event from the tag/condition processing and, based on transaction event rules, may cancels the transaction, invalidate the token, or modify the token prior to continuing the transaction via a transaction message 330. Token recipient terminal 308 responds to receipt of a token, modified or not, by sending an account authorization request 332 to resource server 306.

Figure 4A:
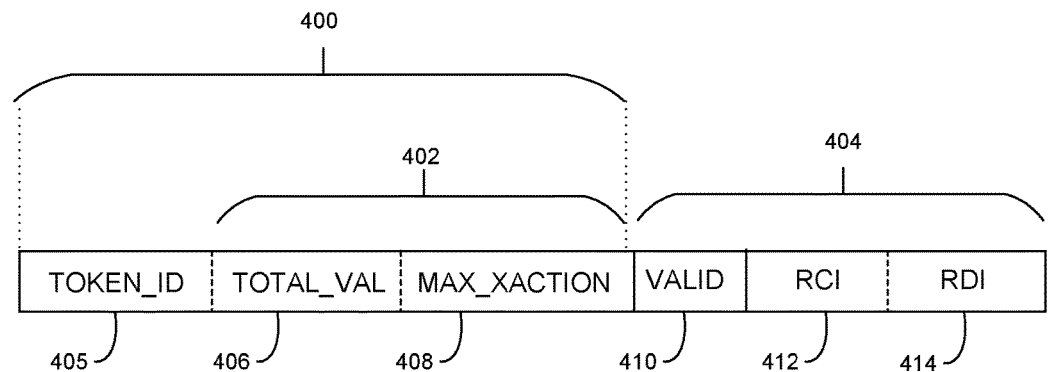
FIG. 4A is a conceptual diagram illustrating a token construct in accordance with an embodiment.
Figure 4B:
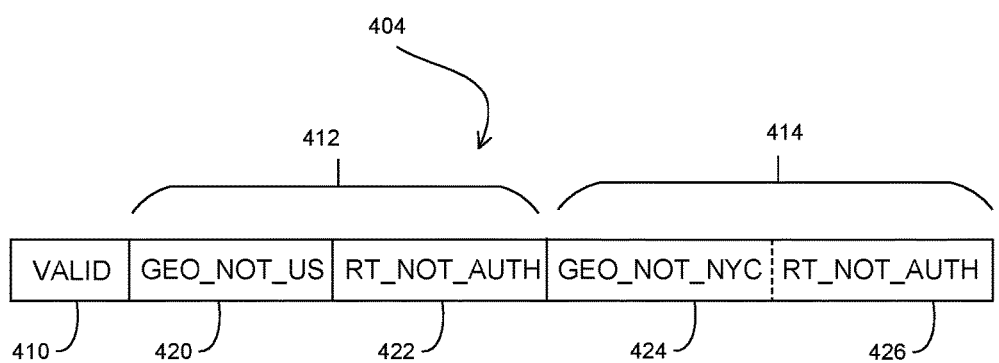
FIG. 4B is a conceptual diagram illustrating validation parameters encoded as tags associated with a token in accordance with an embodiment.

FIG. 4A is a conceptual diagram illustrating a token construct in accordance with one embodiment. The depicted token construct includes a token 400 which may be generated by a resource account program stored within a resource server or by a resource account program locally stored within a portable electronic device. Token 400 includes a token ID field 405 that contains a pseudo-randomly generated numeric or alphanumeric code that serves to identify the token such as by a token recipient terminal which sends the token ID to a resource account manager which can map the token ID to centrally stored account information. Token 400 further includes a total value field 406 and a per-transaction value limit field 408. Total value field 406 specifies a number of resource value units (e.g., number of US dollars) that are assigned as a total credit value to token 400 and usable via resource transactions (e.g., POS transactions). Transaction limit field 408 specifies the maximum number of resource units that is authorized to be used in any single resource transaction.

As further depicted, a set of validation parameters 404 are logically associated with token 400. The association of one or more of validation parameters with token 400 may be implemented by a locally stored resource account application or a token manager generating usage tags specifying the validation parameter(s). The association may be effectuated by inserting the validation parameter value within pre-specified fields in a token data structure or by concatenating a tag data structure containing the respective validation parameter fields onto the token data structures. Alternatively, the data structure entailing token 400 and the data structure entailing the validation parameters 404 may be maintained in separately named and stored data structures that are otherwise programmatically associated such as via the resource account application program. As shown in further detail with reference to FIG. 4B in conjunction with FIG. 4A, validation parameters 404 include a token validation/invalidation flag 410, a resource connect invalidate (RCI) field 412, and a resource disconnect invalidate (RDI) condition field 414. Validation flag 410 is typically a single bit flag that may be asserted and/or de-asserted by user input to the resource account application or by operation of a locally stored and executed token manager or token state manager.

RCI field 412 contains information that specifies one or more particular environmental or transactional parameters that are processed in association with a determination that the host token transfer device is currently (i.e., in real time) communicatively connected to a remote resource account server or to an account interface program executed by the resource server. The illustrated RCI field 412 includes a GEO_NOT_US sub-field 420 and a RT_NOT_AUTH sub-field 422. GEO_NOT_US sub-field 420 specifies whether or not the host token transfer devices is currently located within the geographic boundaries of the United States such as may be determined by Global Positioning System (GPS) functionality within the device. RT_NOT_AUTH sub-field 422 specifies a resource transaction type (e.g., transaction requiring express recipient terminal authentication) or other resource transaction characterization (e.g., transaction involving a particular product type) for which the token is not authorized to be used.

RDI field 414 contains information that specifies one or more particular environmental or transactional parameters that are processed in association with a determination that the host token transfer device is not currently communicatively connected to a remote resource account server or to an account interface program executed by the resource server. The depicted RDI field 414 includes a GEO_NOT_NYC sub-field 424 and a RT_NOT_AUTH sub-field 426. GEO_NOT_NYC sub-field 424 specifies whether or not the host token transfer devices is currently located within the geographic boundaries of a city, such as New York City, as may be determined by GPS functionality. RT_NOT_AUTH sub-field 426 specifies a resource transaction type (e.g., transaction requiring express recipient terminal authentication) or other resource transaction characterization (e.g., transaction involving a particular product type) for which the token is not authorized to be used.

As explained in further detail with reference to FIGS. 5-8, a token state manager selects the parameters 420 and 422 included in RCI field 412, or selects the parameters 424 and 426 included in RDI field 414 as the overriding validation parameters to be used in determining whether or not to modify a token status (e.g., invalidate the token) and/or cancel an initiated transaction sequence. Consistent with an aspect of the depicted embodiments, the selection is based on a real-time determination of whether or not the host token transfer device is currently communicatively coupled over a network to a resource account program corresponding to the resource account from which the token was issued.

FIG. 5 is a conceptual diagram of a transaction event table 500 in accordance with one embodiment. As explained in further detail with reference to FIGS. 6-8, a token state manager may access event table 500 during a resource transaction to modify the transaction and/or modify the subject token(s) that may be utilized during the transaction. Event table 500 includes token parameter and event condition values logically categorized by column and logically associated within each row. In the depicted embodiment, event table 500 includes columns designated PARAMETER, C_REG, REG_VAL, RCI_T1, RDI_T1, RCI_T2, and RDI_T2. The fields in the C_REG column specify the identity of individual system registers and the fields in adjacent column REG_VALUE specify values that are recorded in the corresponding system registers, such as SPR's 224, 226, and 228 in FIG. 2. The fields in the RCI_T1 column specify values that are entered as usage parameters for a generated Token_1 and that are to be applied when the host token transfer device has been determined to be communicatively connected to a resource account network interface. The fields in the RDI_T1 column specify values that are entered as usage parameters for the same Token_1 and that are to be applied when the host token transfer device has either not been determined to be communicatively connected to a resource account network interface or has been affirmatively determined not to be connected to the interface.

The PARAMETER column includes multiple application or system modifiable fields that specify the types/categories of parameters and corresponding conditions will be recorded as system conditions or preset requisite limits in the respective rows. The depicted PARAMETER column specifies the condition parameters as including a maximum transaction resource value, MAX_INCREMENT, a geographic location, GEO, an NFC reader authentication level, AUTHEN_NFC_ID, and a body contact validate/invalidate condition, BC/BCI. As illustrated, the MAX_INCREMENT row includes fields that specify preset maximum per-transaction resource value limits for tokens T1 and T2 including RCI_T1 (500 units), RDI_T1 (25 units), and RDI_T2 (20 units) and which are stored in event table 500 following processing of the corresponding validation parameters associated with tokens T1 and T2. The GEO row includes a field identifying condition register CR_2 as holding a current geographic location specifier (LOCAL or REMOTE) for the host token transfer device, and associated fields specifying LOCAL/REMOTE as transaction limitation parameters for tokens T1 and T2. The AUTHEN_NFC_ID row includes a field identifying the condition register CR_3 as holding an NFC reader authentication level (from among LEVELS 1-3), and associated fields specifying that token T1 requires LEVEL 3 reader authentication when the host device is connected (per the RCI_T1 entry) but a higher level, LEVEL 2, when disconnected (per the RD_T1 entry). Similarly, the RCI_T2 and RDI_T2 validation parameter entries for the AUTHEN_NFC_ID row indicate that LEVEL_2 authentication is required for connected mode transaction of token T2 and LEVEL_1 authentication is required for disconnected mode transaction of token T2. The BC/BCI row may be included in a transaction event table for tokens that may be transferred by a wearable electronic device, such as device 120 depicted and described with reference to FIG. 1. The illustrated BC/BCI row includes a C_REG field identifying condition register CR_4 as holding a flag indicating whether the host wearable token transfer device currently detects being in some form of physical contact or proximity with a user (e.g., wearer) of the device. The BC/BCI row further includes fields specifying that body contact (represented as BC flag) is required for transacting either of token T1 or T2 when the host device is not currently connected to a resource interface.

Figure 6:
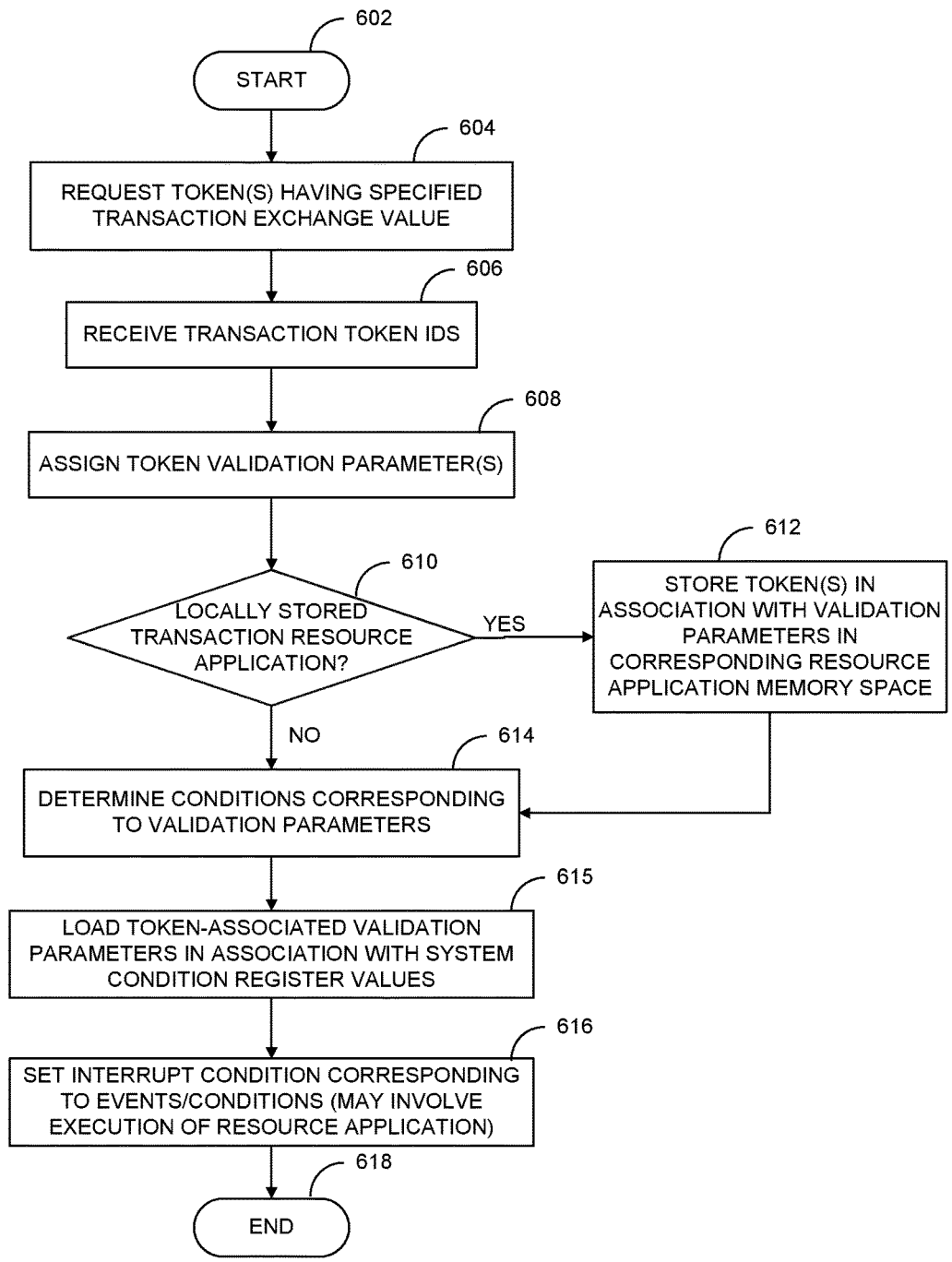
FIG. 6 is a high-level flow diagram illustrating steps and functions for configuring a token transfer device to process token transactions in accordance with an embodiment.

FIG. 6 is a high-level flow diagram illustrating steps and functions for configuring a token transfer device to process token transactions in accordance with an embodiment. The process begins as shown at steps 602 and 604 with a token transfer device or a resource interface device requesting one or more tokens. In one embodiment, the request is from a resource interface device, which may or may not also include token transfer functionality, to a resource account manager interface. In another embodiment, the request is from a token transfer device, such as a wearable electronic device that does not have network access but does have a near field communication interface such as Bluetooth. In this embodiment, the request is sent by the wearable device to a proximately located partner device such as a network enabled smartphone. As shown at step 604, the request typically specifies a transaction exchange value in monetary or other credit value units.

As depicted at step 606 and 608, one or more tokens are received from a token issuing system such as a resource account management system in response to the request and are assigned validation parameters such as the parameters depicted in FIGS. 4 and 5. The validation parameters may be assigned by user interaction with a token resource manager application or a system-level token state manager. The process continues as shown at step 610 with a determination of whether the host device that received the tokens includes a locally stored transaction resource application from which the underlying token values were generated. The resource application may be, for example, a proprietary credit card application for locally managing account information for an account from which the tokens were generated. If so, the received tokens are stored in logical association with the assigned validation parameters in the application memory space allocated to the resource application (step 612). Whether or not the tokens are stored in association with corresponding local resource account applications, a token state manager determines conditions corresponding to the assigned validation parameters (step 614) and loads the token-associated parameters in association with system condition registers (step 615) in a manner such that the token state manager can subsequently compare the loaded parameter values with corresponding condition values such as those depicted in event table 500 in FIG. 5. Token configuration concludes as depicted at steps 616 and 618 with the token state manager setting interrupt conditions corresponding to transaction event rules that are utilized as described in further detail with reference to FIGS. 7 and 8.

Figure 7:
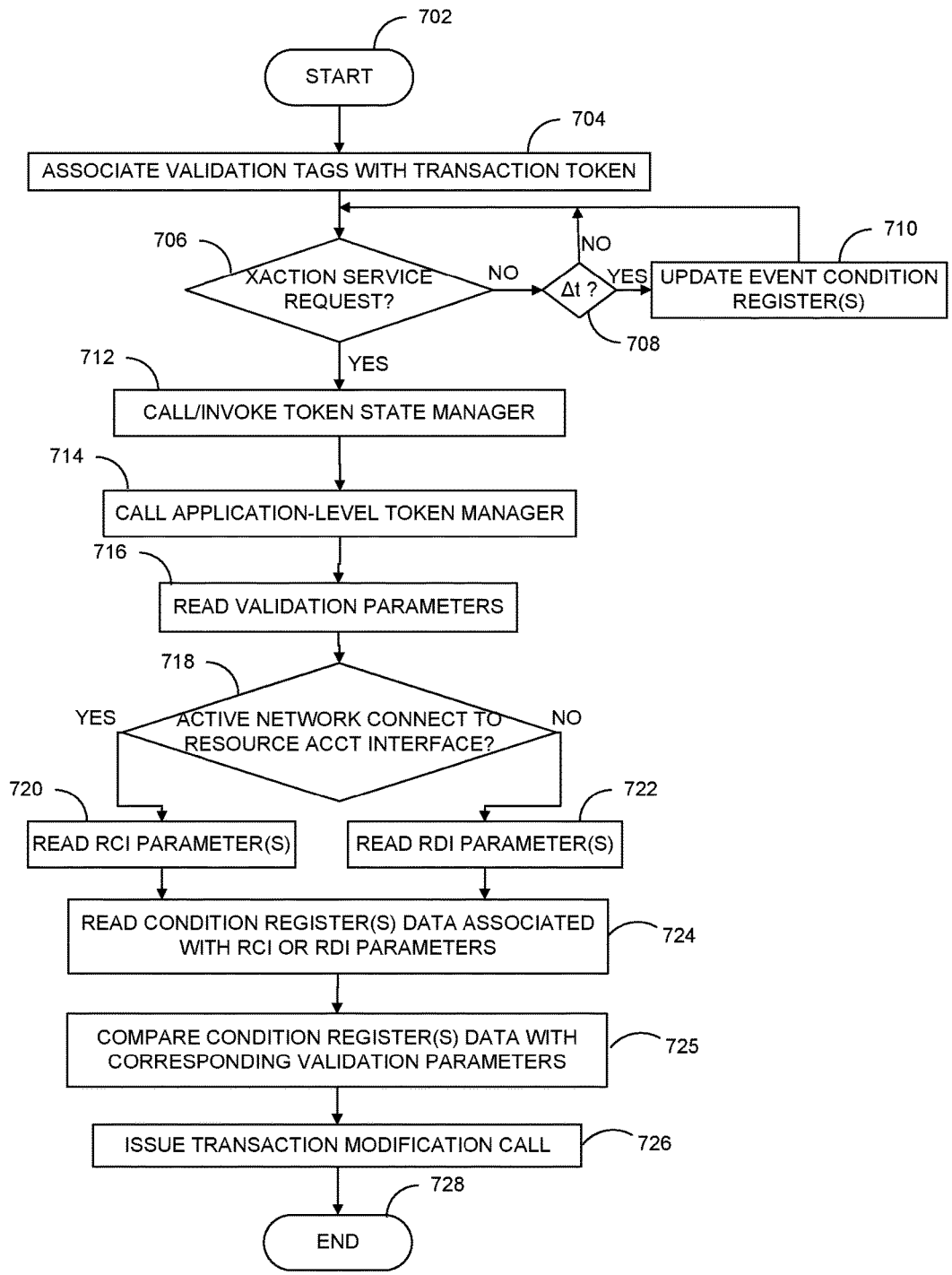
FIG. 7 is a high-level flow diagram depicting steps performed for processing a token transaction in accordance with an embodiment.

FIG. 7 is a high-level flow diagram depicting steps performed for processing a token transaction in accordance with one embodiment. The process begins as shown at steps 702 and 704 with a token manager application assigning and associating validation parameter tags with a token. During periods between token transactions, a token state manager operates as a continuous background process to periodically update event condition registers such as CR_2, CR_3, and CR_4 shown in FIG. 5 (steps 706, 708, and 710). As depicted at steps 706, 712, and 714, one or both of a token state manager and/or an application level token manager are called or otherwise invoked in response to or in association with a transaction service request from the host token transfer device. The token state manager, possibly in coordination with the token manager application, accesses and reads the token-associated validation parameters (step 716). In one embodiment, the token state manager and/or the application-level token manager access the token-associated tags to read the corresponding validation parameters. In another embodiment, the token state manager accesses and reads the validation parameters from a condition table configured as depicted and described with reference to FIGS. 5 and 6.

The process continues as shown at step 718 with the token state manager determining whether or not the host token transfer device is currently communicatively connected with a resource account network interface. The resource account network interface may be as described with reference to FIGS. 1 and 2 and, more specifically, may be an Internet web document having a specified Universal Resource Identifier (URI) that is password accessible. The determination of whether the host token transfer device is connected may comprise reading a system register such as SPR 224 in FIG. 2. In response to determining that the token transfer device is currently connected with the resource account network interface, the token state manager reads the validation parameters applicable to a host device connect condition (step 720). If determined at step 718 that the host device is not currently connected to the resource account network interface, the token state manager reads and applies the validation parameters applicable to a host device disconnect condition (step 722). As shown at step 724, the token state manager accesses and reads and condition register data corresponding to a connect condition if determined that the host device is connected to the resource account network interface, or reads condition register data corresponding to a disconnect condition if determined that the host device is connected to the resource account network interface. In one embodiment, the condition register data is accessed from a condition table configured such as depicted and described with reference to FIGS. 5 and 6.

To determine whether or not to modify the transaction and/or the token, the token state manager compares the condition register data with the corresponding host-connect or host-disconnect validation parameters (step 725) and applies transaction event rules. The transaction event rules may comprise program instructions within the token state manager that, for example, call for a transaction or token modifications based on relations between fields within a given row of event table 500 in FIG. 5. For example, a transaction event rule may comprise instructions that specify a token modification call be issued to reducing a specified maximum transaction value in response to determining that a MAX_INCREMENT value specified in the RDI_T1 field is lower than a transaction maximum value specified as part of the originally issued token. As another example, a transaction event rule may comprise instructions that specify a transaction cancellation call be issued in response to determining a no body contact condition currently exists and that the corresponding validation parameter specifies a body contact requirement. The token state manager then determines and issues the transaction modifications based applying event rules to the compared validation parameter and condition register data (step 726) and the process ends (step 728).

Figure 8:
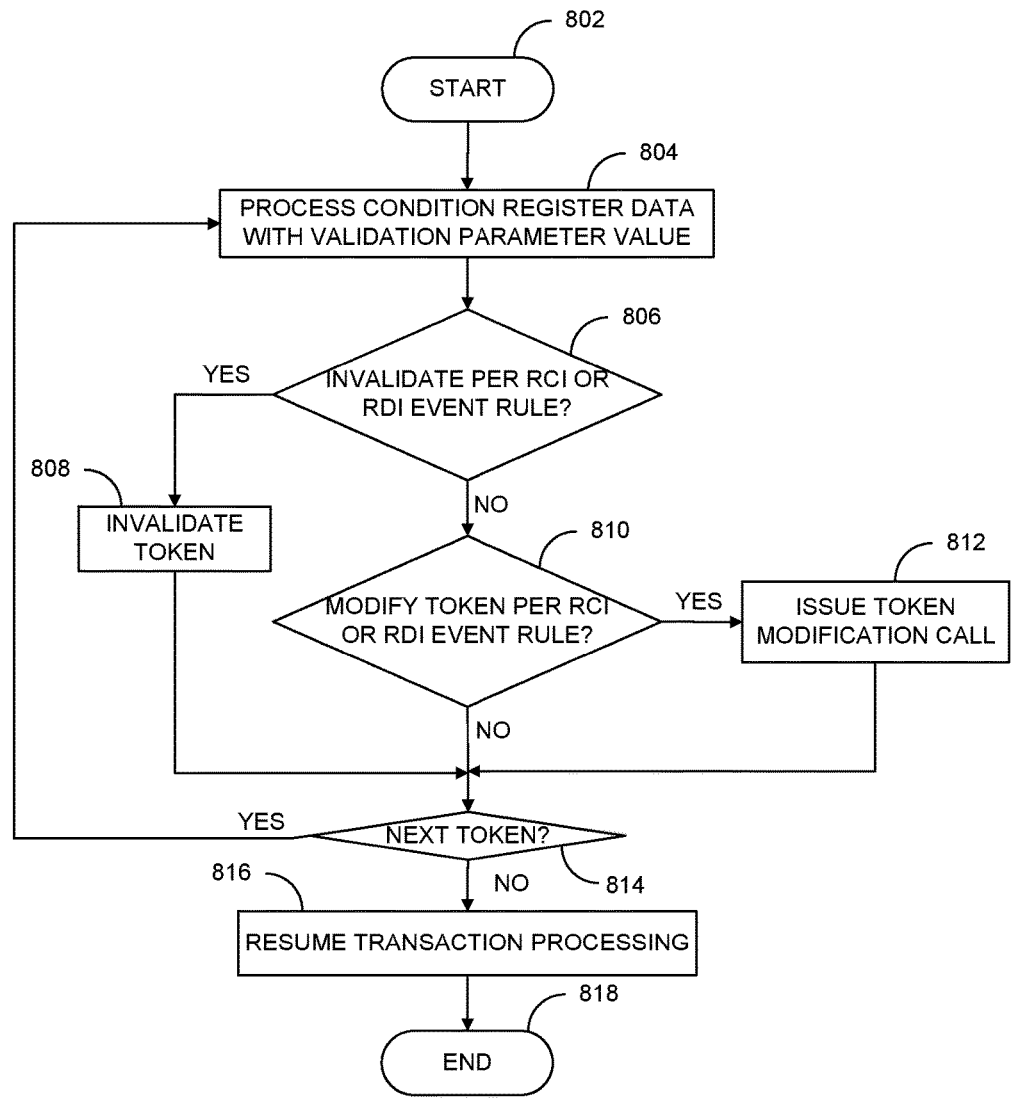
FIG. 8 is a flow diagram depicting steps performed by a token state manager during a token transaction in accordance with an embodiment.

FIG. 8 is a flow diagram depicting steps performed by a token state manager during a token transaction in accordance with one embodiment. The process begins as shown at steps 802 and 804 with the token state manager processing condition register data with validation parameters that have been associated with a token via tags or other logical association. The token state manager applies the validation parameters as connect event or disconnect event rules (RCI or RDI rules). The token state manager invalidates the token, such as by de-asserting the VALID parameter 410 in FIG. 4, if the resultant rule applied to the corresponding event condition indicates a token invalidating event (steps 806 and 808). The transaction event, determined by the RCI or RDI rules applied to the event conditions, may alternately be a token modification event which the token state manager responds to by modifying the token (e.g., reducing the token value) accordingly via a token modification call (steps 810 and 812). Other tokens subject to the transaction are similarly processed by the token state manager until the transaction may be resumed and completed (steps 814, 816, and 818).

Figure 9:
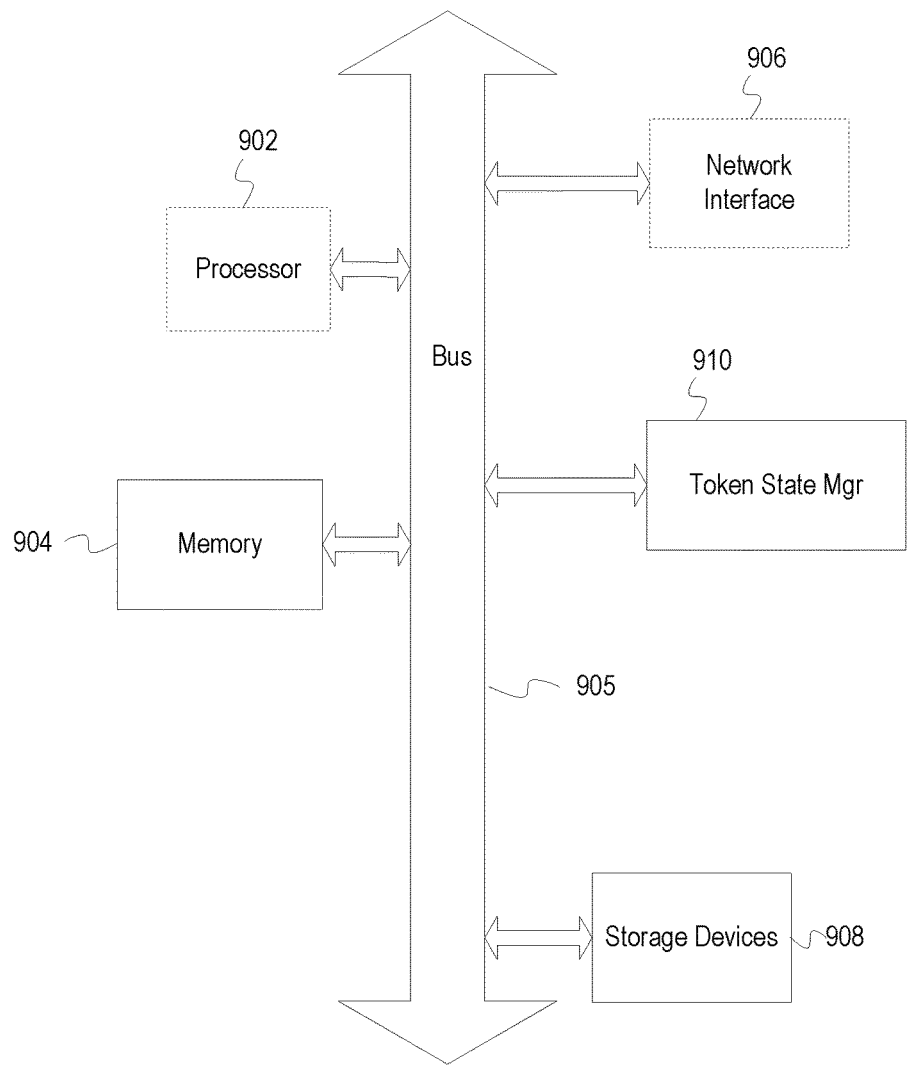
FIG. 9 is a block diagram of a computer system for performing the functions described with reference to FIGS. 1-8.

FIG. 9 depicts an example computer system that include a token state manager unit 910. The computer system includes a processor 902 (possibly including multiple processors, multiple cores, multiple nodes, and/or implementing multi-threading, etc.). The computer system includes memory 904 which may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes an interconnect 905 (e.g., PCI, ISA, PCI-Express, HyperTransport®, InfiniBand®, NuBus, etc.), a network interface 906 (e.g., an Ethernet interface, a Frame Relay interface, SONET interface, wireless interface, etc.), and a storage device(s) 908 (e.g., optical storage, magnetic storage, etc.). Token state manager unit 910 embodies functionality to implement features described above with reference to FIGS. 1-8. Token state manager unit 910 may perform operations for configuring tokens and token-associated validation parameters. Token state manager unit 910 may perform application and system management operations including processing token transactions in a manner dependent on whether computer system is connected to a resource account network interface. Any one of these functionalities may be partially (or entirely) implemented in hardware and/or on processor 902. For example, the functionality may be implemented with an application specific integrated circuit, in logic implemented in processor 902, in a co-processor on a peripheral device or card, etc. Further, realizations may include fewer or additional components not illustrated in FIG. 9 (e.g., additional network interfaces, peripheral devices, etc.).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for processing transactions within a token transfer device, said method comprising:
    storing a transaction token having a specified transaction resource value and an associated validation parameter;
    initiating a transaction service with a token recipient terminal;
    invoking a token state manager in association with said initiating a transaction service; and
    the token state manager,
        determining an event corresponding to the validation parameter, wherein said determining an event comprises:
            determining a resource account network connect activity status; and
            determining condition register data associated with the validation parameter; and
        issuing a transaction modification call based on the determined event and the validation parameter.

2. The method of claim 1, wherein said determining an event further comprises processing the condition register data with a value of the validation parameter.

3. The method of claim 2, wherein the validation parameter includes a first value associated with a network disconnect status of the token transfer device.

4. The method of claim 3, wherein the validation parameter further includes a second value associated with a network connect status of the token transfer device.

5. The method of claim 3, wherein said processing the condition register data with the value of the validation parameter comprises selecting the value of the validation parameter to be compared based on whether the token transfer device is communicatively connected to a resource account network interface.

6. The method of claim 1, wherein said initiating a transaction service commences a transaction startup protocol comprising:
    sending a transaction service request to the token recipient terminal;
    receiving a transaction response from the token recipient terminal; and
    suspending the transaction startup protocol until said issuing a transaction modification call.

7. The method of claim 1, wherein the validation parameter is assigned by a token management program executed from within the token transfer device.

8. The method of claim 1, wherein the token state manager operates in a system memory space of the token transfer device.

9. The method of claim 1, wherein said issuing a transaction modification call comprises the token state manager communicating directly or indirectly to a resource account application to enable or disable the transaction token.

* * * * *